US009995640B2

(12) United States Patent
Mowry et al.

(10) Patent No.: US 9,995,640 B2
(45) Date of Patent: *Jun. 12, 2018

(54) SYSTEMS, DEVICES, AND/OR METHODS FOR MANAGING A THERMOCOUPLE MODULE

(71) Applicant: Siemens Industry, Inc., Alpharetta, GA (US)

(72) Inventors: Stephen Mowry, Kingsport, TN (US); Robert Alan Weddle, Johnson City, TN (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 293 days.

This patent is subject to a terminal disclaimer.

(21) Appl. No.: 14/196,073

(22) Filed: Mar. 4, 2014

(65) Prior Publication Data

US 2014/0185646 A1 Jul. 3, 2014

Related U.S. Application Data

(63) Continuation of application No. 12/206,882, filed on Sep. 9, 2008, now Pat. No. 8,702,306.

(60) Provisional application No. 60/994,938, filed on Sep. 21, 2007, provisional application No. 60/994,750, filed on Sep. 21, 2007.

(51) Int. Cl.
*G01K 15/00* (2006.01)
*G01K 7/02* (2006.01)
*G01K 7/14* (2006.01)

(52) U.S. Cl.
CPC ............ *G01K 15/005* (2013.01); *G01K 7/14* (2013.01); *G01K 15/00* (2013.01)

(58) Field of Classification Search
CPC ........ G01K 7/02; G01K 15/00; G01K 15/007; G01K 15/005; G01K 1/12; G01N 27/123; G01N 25/32
USPC .......... 374/179, 1, 12, 163, 170–173, 2, 141; 136/200; 702/99
See application file for complete search history.

(56) References Cited

U.S. PATENT DOCUMENTS

| | | |
|---|---|---|
| 3,501,957 A | 3/1970 | Jones |
| 3,680,382 A | 8/1972 | Vaiden |
| 3,921,453 A | 11/1975 | Platzer et al. |
| 4,537,516 A | 8/1985 | Epstein |
| 4,588,308 A | 5/1986 | Saito |
| 4,660,993 A | 4/1987 | Benedek |
| 4,748,598 A * | 5/1988 | Kopke ................. G01H 3/005 367/13 |
| 4,774,049 A | 9/1988 | Impink et al. |
| 4,912,989 A | 4/1990 | Cassidy |

(Continued)

FOREIGN PATENT DOCUMENTS

| | | | |
|---|---|---|---|
| EP | 001087217 A1 * | 3/2001 | |
| GB | 2183342 | 6/1987 | |
| JP | 363003231 A * | 1/1988 | |

*Primary Examiner* — Gail Kaplan Verbitsky

(57) ABSTRACT

Certain exemplary embodiments can provide a system, which can comprise a thermocouple input module. The thermocouple input module can be adapted to determine one or more calibration factors. The thermocouple input module can be adapted to store the calibration factors. The thermocouple input module can be adapted to apply the calibration factors to an incoming thermocouple voltage value to obtain an adjusted thermocouple voltage value.

12 Claims, 4 Drawing Sheets

(56) References Cited

U.S. PATENT DOCUMENTS

| | | | |
|---|---|---|---|
| 5,577,837 A * | 11/1996 | Martin | B01F 11/0068 366/145 |
| 5,669,713 A * | 9/1997 | Schwartz | G01K 7/13 374/1 |
| 5,764,684 A | 6/1998 | Pompei | |
| 5,771,180 A * | 6/1998 | Culbert | G04G 3/02 331/158 |
| 5,829,876 A | 11/1998 | Kirkpatrick et al. | |
| 5,857,777 A * | 1/1999 | Schuh | G01K 15/00 374/170 |
| 5,947,748 A | 9/1999 | Licht et al. | |
| 5,969,718 A * | 10/1999 | Mills | G06F 3/0489 345/172 |
| 5,978,593 A * | 11/1999 | Sexton | G05B 19/054 710/1 |
| 6,058,356 A | 5/2000 | Swanson et al. | |
| 6,074,089 A * | 6/2000 | Hollander | G01K 7/13 374/171 |
| 6,141,628 A | 10/2000 | Worth et al. | |
| 6,179,785 B1 * | 1/2001 | Martinosky | G01J 5/02 374/E13.003 |
| 6,293,700 B1 * | 9/2001 | Lund | G01K 7/13 374/181 |
| 6,344,747 B1 | 2/2002 | Lunghofer | |
| 6,515,464 B1 * | 2/2003 | Darmawaskita | H03F 3/45977 324/601 |
| 6,517,240 B1 * | 2/2003 | Herb | G01K 11/24 374/117 |
| 6,527,437 B1 * | 3/2003 | Koh | G01K 15/00 324/179 |
| 6,609,076 B2 | 8/2003 | Schuh et al. | |
| 6,796,711 B2 | 9/2004 | Colson et al. | |
| 6,870,421 B2 | 3/2005 | Abe | |
| 6,890,097 B2 * | 5/2005 | Tanaka | G01K 15/005 374/163 |
| 7,029,171 B2 * | 4/2006 | Tesi | G01K 15/00 327/513 |
| 7,168,852 B2 * | 1/2007 | Linnarsson | C22C 33/08 374/139 |
| 7,259,686 B2 * | 8/2007 | Hollander | G01K 7/023 340/538 |
| 7,322,743 B2 | 1/2008 | Gozloo et al. | |
| 7,421,850 B2 | 9/2008 | Street et al. | |
| 7,539,587 B2 | 5/2009 | Frankel et al. | |
| 7,996,171 B2 | 8/2011 | Banhegyesi | |
| 8,529,126 B2 | 9/2013 | Engelstad et al. | |
| 9,297,705 B2 * | 3/2016 | Aggarwal | G01K 1/02 |
| 2003/0001096 A1 | 1/2003 | Pompei | |
| 2003/0035463 A1 | 2/2003 | Breinlinger | |
| 2004/0190592 A1 | 9/2004 | Lojen | |
| 2006/0067377 A1 | 3/2006 | Streicher | |
| 2006/0122473 A1 | 6/2006 | Kill et al. | |
| 2006/0149304 A1 * | 7/2006 | Huang | A61H 39/08 606/189 |
| 2006/0153276 A1 | 7/2006 | Hartmann | |
| 2007/0150819 A1 * | 6/2007 | Goodman | G06F 17/30861 715/749 |
| 2007/0252633 A1 | 11/2007 | Frankel et al. | |
| 2008/0013598 A1 | 1/2008 | Perotti et al. | |
| 2008/0177493 A1 | 7/2008 | Shumaker et al. | |
| 2008/0212643 A1 | 9/2008 | McGahhey et al. | |
| 2008/0215278 A1 * | 9/2008 | Colsch | H01H 69/01 702/85 |
| 2009/0299672 A1 | 12/2009 | Zhang et al. | |
| 2010/0286842 A1 * | 11/2010 | Aggarwal | G01K 1/02 700/300 |
| 2011/0030594 A1 | 2/2011 | Kimberlin et al. | |
| 2014/0112368 A1 * | 4/2014 | Engelstad | G01K 1/14 374/1 |

* cited by examiner

SYSTEMS, DEVICES, AND/OR METHODS FOR MANAGING A THERMOCOUPLE MODULE

CROSS-REFERENCE TO RELATED APPLICATIONS

This is a continuation of U.S. patent application Ser. No. 12/206,882, filed Sep. 9, 2008, now U.S. Pat. No. 8,702,306, which claims priority to U.S. Provisional Patent Application No. 60/994,938, filed Sep. 21, 2007, and U.S. Provisional Patent Application No. 60/994,750, filed Sep. 21, 2007, each of which is hereby incorporated by reference herein in its entirety for all purposes.

BACKGROUND

U.S. Pat. No. 6,870,421 (Takashi), which is incorporated by reference herein in its entirety, allegedly discloses that the "invention provides a temperature characteristic compensation apparatus that correct temperature characteristics of control circuits using thermal sensors into linear or optional temperature gradients to guarantee correct and stable operations thereof. It is equipped with a temperature characteristic compensation apparatus, that can include: a constant current source in which a plurality of constant current paths that include the constant current path having a first resistance being interposed therein, which compose current mirror circuits in multiple stages, a band gap circuit formed from a pair of transistors that are connected to the constant current paths, respectively, and a voltage follower circuit, including the aforementioned constant current source and the band gap circuit that provide a reference voltage, which supplies the reference voltage at a low impedance. The ratio between the first and second resistances can be freely selected in connection with the ratio between emitter areas of the pair of transistors (the size ratio of the two transistors), such that a gradient of temperature coefficient of the output voltage can be flexibly set." See Abstract.

U.S. Pat. No. 6,344,747 (Lunghofer), which is incorporated by reference herein in its entirety, allegedly discloses that a "device and method for monitoring the condition of a thermocouple. In a preferred embodiment the device comprises a pair of thermocouples, each thermocouple comprising first and second thermoelement wires, and a diagnostic element selectively electrically coupled at a junction with one of the thermoelements. In a preferred embodiment, the diagnostic element is selected such that it is more stable at the expected operating temperature range of the thermocouple than the thermoelement wires themselves are. The diagnostic element can be switched into electrical connection with any of the thermoelements forming the thermocouples to thereby define one or more loops. An initial loop resistance is measured and recorded around each of the thermoelement/diagnostic element loops. This initial resistance is stored in a calibration matrix as a reference value. The initial loop resistance may be taken as part of a calibration process or during initial operation of the thermocouple. Subsequent loop resistance measurements are then taken over time as the thermocouples age and compared against the reference value. By comparing the reference value to subsequent measurements, the level of degradation of the thermoelements can be monitored. Further, in an embodiment utilizing an electrically conductive sheath material, a conductive sheath wire may be used to connect the sheath to any one of the thermoelements or the diagnostic element. By monitoring the resistance in a measurement circuit formed thereby, potential or actual virtual junction error in the thermocouple assembly may be detected." See Abstract.

SUMMARY

Certain exemplary embodiments can provide a system, which can comprise a thermocouple input module. The thermocouple input module can be adapted to determine one or more calibration factors. The thermocouple input module can be adapted to store the calibration factors. The thermocouple input module can be adapted to apply the calibration factors to an incoming thermocouple voltage value to obtain an adjusted thermocouple voltage value.

BRIEF DESCRIPTION OF DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which can comprise a thermocouple input module. The thermocouple input module can be adapted to determine one or more calibration factors. The thermocouple input module can be adapted to store the calibration factors. The thermocouple input module can be adapted to apply the calibration factors to an incoming thermocouple voltage value to obtain an adjusted thermocouple voltage value.

Figure 1:
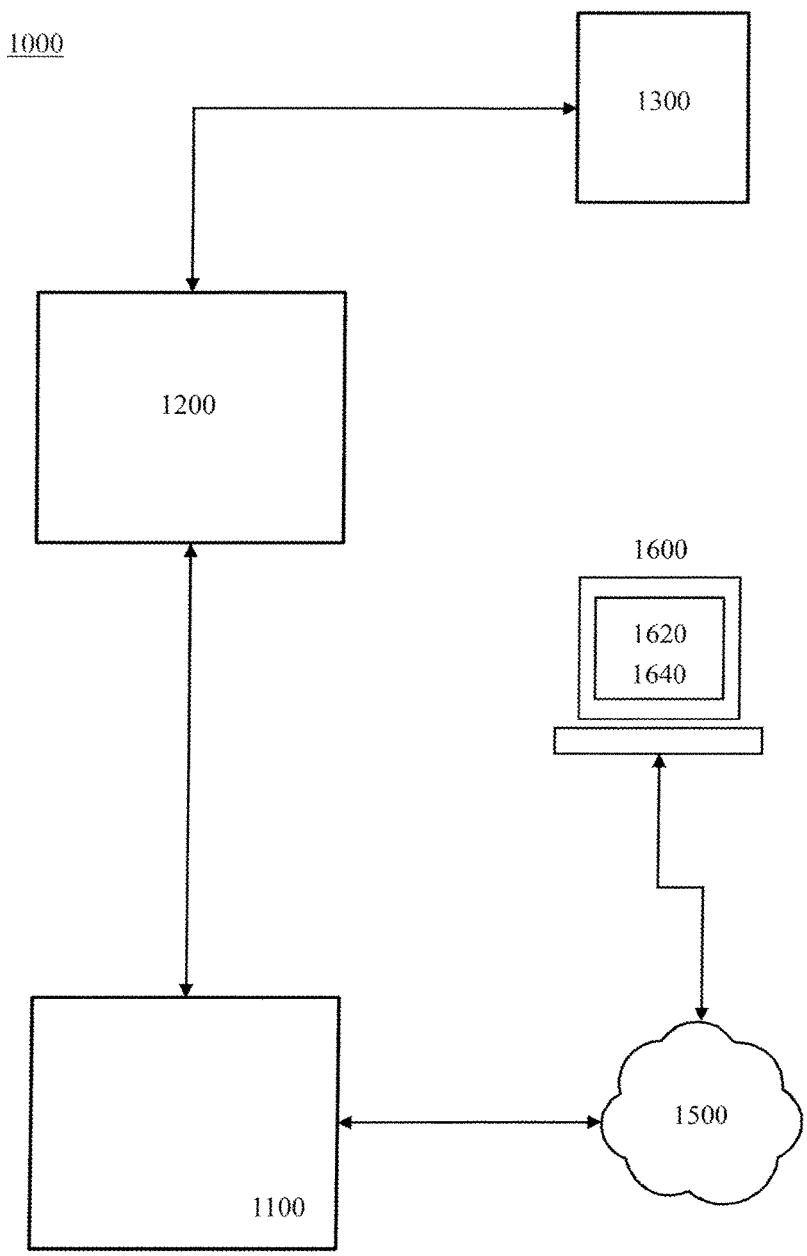
FIG. 1 is a block diagram of an exemplary embodiment of a system 1000.

FIG. 1 is a block diagram of an exemplary embodiment of a system 1000, which can comprise a programmable logic controller 1100. Programmable logic controller 1100 can comprise and/or be communicatively coupled to an input module 1200, which can be a thermocouple input module. Input module 1200 can be communicatively coupled to any desired number of sensors, such as a sensor 1300, which can be a thermocouple. Via the control program, programmable logic controller 1100 can be adapted to receive information from sensor 1300 and/or, via a control program, control an actuator in hard real time.

Input module 1200 can be adapted to:

receive calibration voltage values from the thermocouple;

using the calibration voltage values received from a thermocouple, determine one or more calibration factors selected from an offset, positive voltage gain, negative voltage gain, and a cold junction temperature adjustment;

store the calibration factors;

prior to obtaining a temperature value approximately corresponding to an incoming thermocouple voltage value, apply the calibration factors to the incoming thermocouple voltage value to obtain an adjusted thermocouple voltage value;

convert the adjusted thermocouple voltage value to a temperature value;

transmit the temperature value to the programmable logic controller; and/or reset the calibration factors to stored defaults.

In certain exemplary embodiments, the one or more calibration factors can be determined within firmware of the thermocouple input module. In certain exemplary embodiments, the one or more calibration factors comprise the offset, positive voltage gain, negative voltage gain, and the cold junction temperature adjustment.

Programmable logic controller 1100 can be communicatively coupled to an information device 1600 via a network 1500. Information device 1600 can comprise and/or be communicatively coupled to a user interface 1620 and a user program 1640. User program 1540 can be adapted to monitor and/or control one or more activities associated with programmable logic controller 1100 such as creating, modifying, and/or compiling the control program. User interface 1620 can be adapted to render information regarding programmable logic controller 1100 such as information regarding creating, modifying, and/or compiling the control program.

For thermocouple modules, such as those used with industrial Programmable Logic Controller (PLC) systems, a voltage calibration can be performed to compensate for signal degradation due to wiring and/or thermocouple inaccuracies and/or to obtain high accuracy specifications. A factory calibration can be performed during a manufacturing process to calibrate errors that arise inside a module's hardware circuit. Yet for some applications, this calibration of the module by the factory is not adequate for the customer due additional errors introduced by signal degradation caused by poor wiring and/or sensor error.

A customer can attempt to compensate for these additional errors via performing a user calibration for a particular thermocouple input module as it is used in a given application. In certain exemplary embodiments, such a calibration can be performed in the control program of the PLC. In certain exemplary embodiments, a thermocouple's thermal response characteristic can be non-linear and errors resulting therefrom can be relatively difficult to correct. In certain exemplary embodiments, the customer can adjust a temperature reading at 0° C. for a cold-junction temperature adjustment. In certain exemplary embodiments, attempting to determine a non-linear response of the thermocouple can be a time-consuming process.

Rather than attempting to calibrate within the PLC program, certain exemplary embodiments can perform user calibration inside the thermocouple input module, which can be an Input/Output module. In certain exemplary embodiments, these calibration factors can be applied to adjust the input value before it is sent to the PLC.

Figure 2:
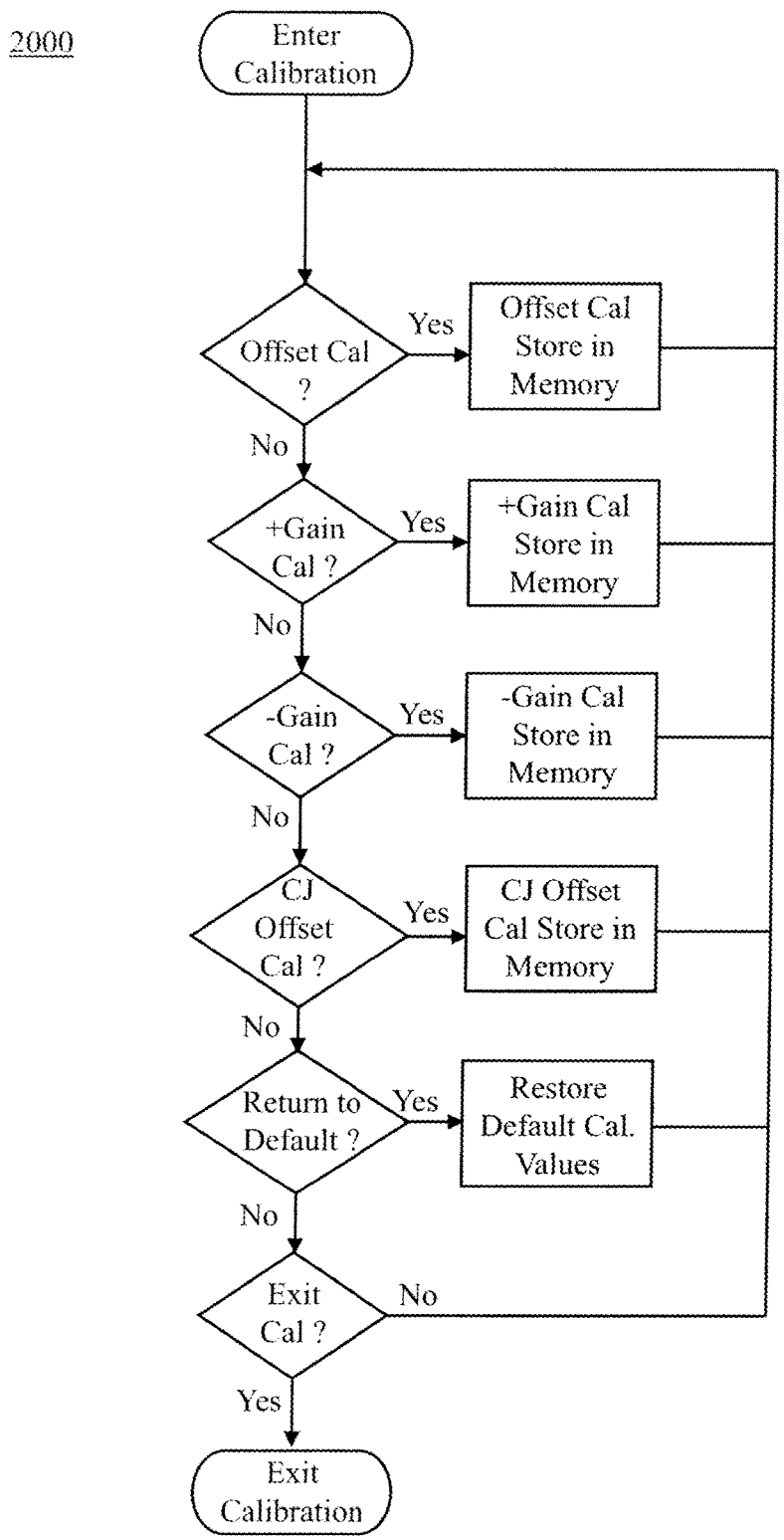
FIG. 2 is a flowchart of an exemplary embodiment of a method 2000.

FIG. 2 is a flowchart of an exemplary embodiment of a method 2000, which can allow errors to be compensated in a process and/or can have an improved accuracy since the module can compensate the input as a linear voltage before it is converted to temperature and sent to the PLC. In addition, this solution does not require any special PLC code to compensate the thermocouple readings so the response time of the PLC program need not be affected.

Performing such a calibration inside the thermocouple module firmware can allow a voltage calibration to be performed linearly since the module has access to the voltage information before it is converted to temperature and sent to the PLC. Voltage calibration can utilize a voltage offset, positive voltage gain, and/or negative voltage gain. Certain exemplary embodiments can calibrate the temperature error associated with the thermocouple cold-junction.

Note that performing user calibration can cause unexpected behavior for the module if the calibration process is not performed properly. Thus, one feature that can be added is a reset to factory default calibration. With this approach, if the user were to accidentally make a mistake during the calibration process, the module could be restored to the factory default calibration and the user could attempt to perform the user calibration again.

Figure 3:
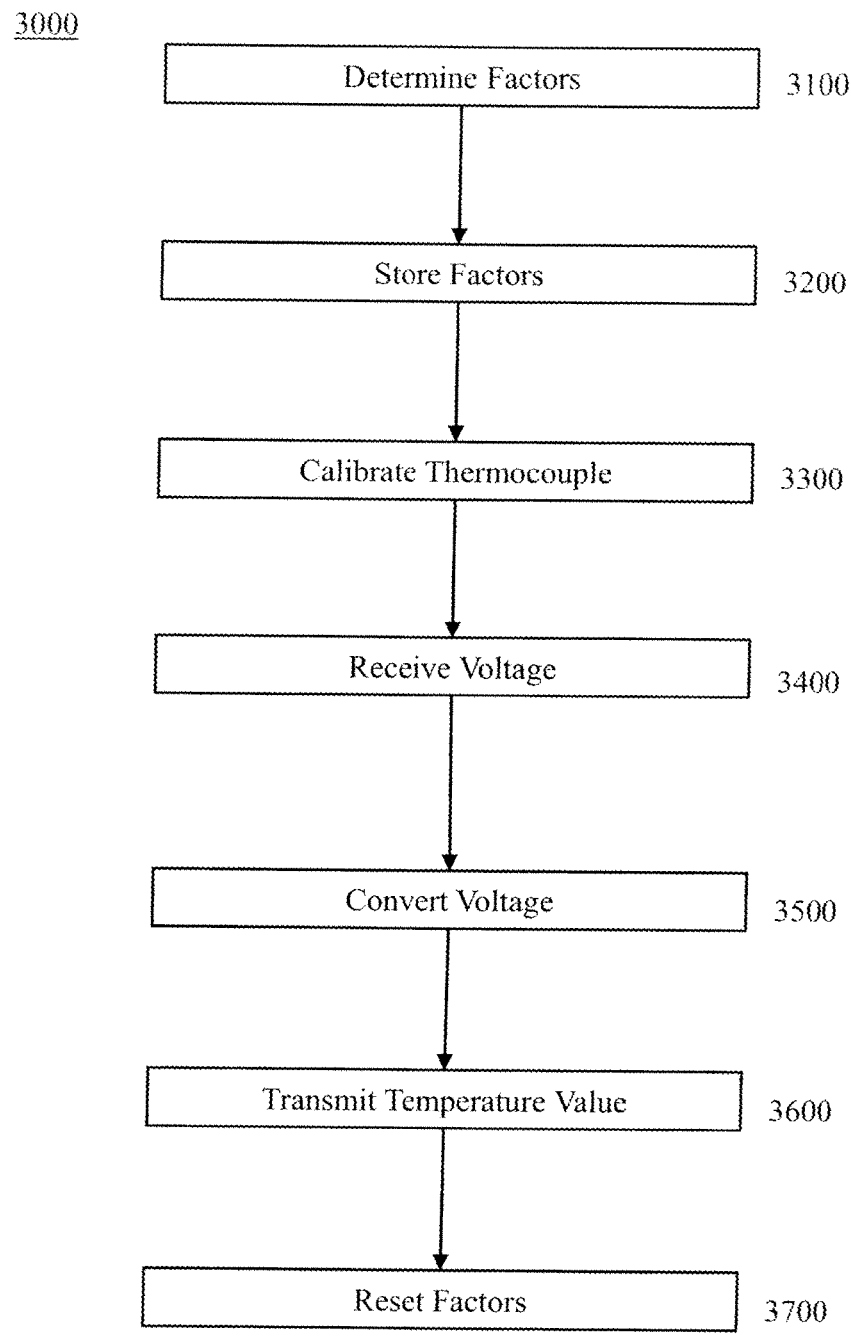
FIG. 3 is a flowchart of an exemplary embodiment of a method 3000.

FIG. 3 is a flowchart of an exemplary embodiment of a method 3000. Any activity or subset of activities of method 3000 can be performed within a thermocouple input module coupled to a programmable logic controller. One or more of the activities of method 3000 can be performed using calibration voltage values received from a thermocouple. At activity 3100, calibration factors adapted for use in calibrating a thermocouple can be determined. The calibration factors can be selected from an offset, positive voltage gain, negative voltage gain, and a cold junction temperature adjustment. In certain exemplary embodiments, one or more calibration factors can be determined within firmware of the thermocouple input module.

At activity 3200, the calibration factors can be stored. In certain exemplary embodiments, the calibration factors can be stored in a memory of the input module.

At activity 3300, the thermocouple can be calibrated. The thermocouple can be calibrated based upon a calibration voltage value obtained from the thermocouple. The thermocouple can be calibrated using the calibration factors.

At activity 3400, a voltage value can be obtained from the thermocouple. The voltage value can be transmitted via electrically conductive wires. The voltage value can be proportional to a temperature of the thermocouple.

At activity 3500, the voltage value can be converted to an approximate temperature value. In certain exemplary embodiments, within the thermocouple input module, prior to obtaining a temperature value approximately corresponding to an incoming thermocouple voltage value, the calibration factors can be applied to the incoming thermocouple voltage value to obtain an adjusted thermocouple voltage value. The adjusted thermocouple voltage value can be converted to a temperature value.

At activity 3600, the temperature value can be transmitted to a PLC. The PLC can be adapted to utilize the temperature value as an input in a control program. The control program can be adapted to cause operation of an actuator in hard real time.

At activity 3700, the calibration factors can be reset to factory default values. In certain exemplary embodiments, the factory default values can be used to obtain an approximate temperature reading responsive to a determination that calibration factors being used in method 3000 are found to be unacceptable and/or erroneous.

Figure 4:
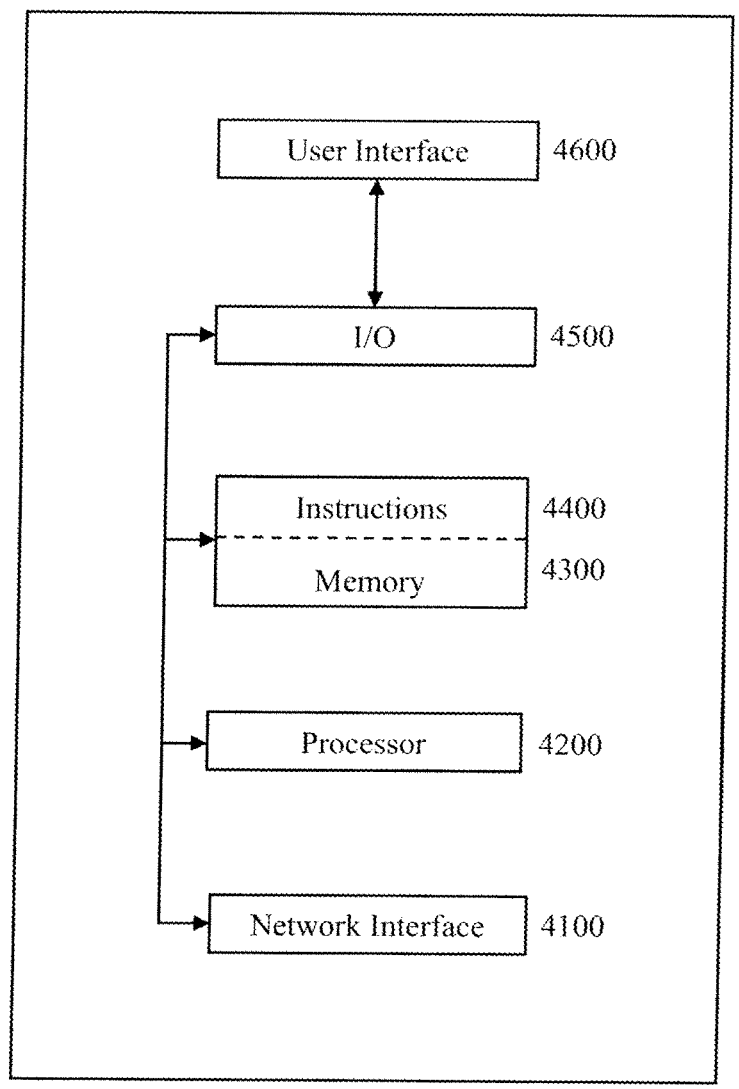
FIG. 4 is a block diagram of an exemplary embodiment of an information device 4000.

FIG. 4 is a block diagram of an exemplary embodiment of an information device 4000, which in certain operative embodiments can comprise, for example, information device 1600 of FIG. 1. Information device 4000 can comprise any of numerous circuits and/or components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc.).

adapted to—suitable, fit, and/or capable of performing a specified function.

adjust—to change so as to match, fit, adapt, conform, and/or be in a more effective state.

apply—to put to, on, and/or into action and/or service; to implement; and/or to bring into contact with something.

approximately—about and/or nearly the same as.

associate—to relate, bring together in a relationship, map, combine, join, and/or connect.

automatically—acting and/or operating in a manner essentially independent of external human influence and/or control. For example, an automatic light switch can turn on upon "seeing" a person in its view, without the person manually operating the light switch.

based—being derived from.

based upon—determined in consideration of and/or derived from.

calibration—a checking of an instrument against a reference point or standard.

calibration factor—a value that when mathematically applied to a measured value adjusts the measured value to that of a reference point and/or standard value.

can—is capable of, in at least some embodiments.

cause—to bring about, provoke, precipitate, produce, elicit, be the reason for, result in, and/or effect.

circuit—an electrically conductive pathway and/or a communications connection established across two or more switching devices comprised by a network and between corresponding end systems connected to, but not comprised by the network.

cold junction temperature adjustment—a correction of a measured voltage value of a thermocouple that is based upon a measurement, at a location at which two metal strips of the thermocouple are joined, at a predetermined temperature that is relatively low compared to an expected operating temperature of the thermocouple.

communicatively—linking in a manner that facilitates communications.

comprise—to include but not be limited to, what follows.

configure—to design, arrange, set up, shape, and/or make suitable and/or fit for a specific purpose.

control—(n) a mechanical or electronic device used to operate a machine within predetermined limits; (v) to exercise authoritative and/or dominating influence over, cause to act in a predetermined manner, direct, adjust to a requirement, and/or regulate.

convert—to transform, adapt, and/or change, such as from a first form to a second form.

corresponding—related, associated, accompanying, similar in purpose and/or position, conforming in every respect, and/or equivalent and/or agreeing in amount, quantity, magnitude, quality, and/or degree.

couple(d)—to join, connect, and/or link two things together.

data—information represented in a form suitable for processing by an information device.

deadline—a time interval during which an activity's completion has more utility to a system, and after which the activity's completion has less utility. Such a time interval might be constrained only by an upper-bound, or it might be constrained by both upper and lower bounds.

default—a predetermined value that is used unless a superseding value is provided.

define—to establish the meaning, relationship, outline, form, and/or structure of; and/or to precisely and/or distinctly describe and/or specify.

determine—to obtain, calculate, decide, deduce, establish, and/or ascertain.

firmware—a set of machine-readable instructions that are stored in a non-volatile read-only memory, such as a PROM, EPROM, and/or EEPROM.

from—used to indicate a source.

further—in addition.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counterproductive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

Human Machine Interface—hardware and/or software adapted to render information to a user and/or receive information from the user.

incoming—entering from an extrinsic location.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

Input/Output (I/O) device—an input/output (I/O) device of an information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

input—a signal, data, and/or information provided to a processor, device, and/or system.

input module—a device and/or system adapted to receive and/or forward information between a programmable logic controller (PLC) and a predetermined set of sensors and/or actuators.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

more—in addition to.

negative voltage gain—an increase or decrease in signal power, voltage, and/or current, expressed as the ratio of output to input having a slope that is less than approximately zero.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications there between. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

obtain—to receive, get, take possession of, procure, acquire, calculate, determine, and/or compute.

offset—a value adapted to correct a measurement when added to the measurement.

one—a single entity.

plurality—more than one.

positive voltage gain—an increase or decrease in signal power, voltage, and/or current, expressed as the ratio of output to input having a slope that is greater than approximately zero.

predetermined—determine, decide, or establish in advance.

prior—earlier in time.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

reset—a control adapted to clear and/or change a threshold.

said—when used in a system or device claim, an article indicating a subsequent claim term that has been previously introduced.

select—to choose an item.

signal—information encoded as automatically detectable variations in a physical variable, such as a pneumatic, hydraulic, acoustic, fluidic, mechanical, electrical, magnetic, optical, chemical, and/or biological variable, such as power, energy, pressure, flow rate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

soft deadline—the general case where completing an activity by a deadline results in a system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with an anti-lock braking system where a slowdown in response would likely cause system failure, possibly even catastrophic failure.

store—to place, hold, retain, enter, and/or copy into and/or onto a machine-readable medium.

substantially—to a considerable, large, and/or great, but not necessarily whole and/or entire, extent and/or degree.

system—a collection of mechanisms, devices, machines, articles of manufacture, processes, data, and/or instructions, the collection designed to perform one or more specific functions.

temperature—measure of the average kinetic energy of the molecules in a sample of matter, expressed in terms of units or degrees designated on a standard scale.

thermocouple—a temperature sensor that produces a temperature-proportional electrical voltage.

transmit—to provide, furnish, supply, send as a signal, and/or to convey (e.g., force, energy, and/or information) from one place and/or thing to another.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a measured, assigned, determined, and/or calculated quantity or quality for a variable and/or parameter.

via—by way of and/or utilizing.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wherein—in regard to which; and; and/or in addition to.

within—inside.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values there between, such as for example, 1.1, 2.5, 3.335, 5, 6.179, 8.9999, etc., and includes all subranges there between, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
one or more thermocouples that transmit calibration voltage values and a thermocouple voltage value;
a thermocouple input module communicatively coupled to the one or more thermocouples;
a programmable logic controller (PLC) communicatively coupled to the thermocouple input module; and
firmware stored in the thermocouple input module; wherein the thermocouple input module:
receives the calibration voltage values from the one or more thermocouples during a user calibration process performed after a factory calibration process;
determines via the firmware one or more calibration factors for the thermocouple input module based on the received calibration voltage values;
receives the thermocouple voltage value from the one or more thermocouples after the user calibration process; and
applies via the firmware the calibration factors to the thermocouple voltage value received from the one or more thermocouples to obtain an adjusted thermocouple voltage value prior to obtaining a temperature value,
wherein the PLC receives the temperature value from the thermocouple input module and utilizes the temperature value as an input in a control program adapted to cause operation of an actuator.

2. The system of claim 1, wherein the calibration factors are selected from an offset, positive voltage gain, negative voltage gain, and a cold junction temperature adjustment.

3. The system of claim 1, wherein the thermocouple input module is further operational to convert the adjusted thermocouple voltage value to the temperature value.

4. The system of claim 1, wherein the thermocouple input module is further operational to:
convert the adjusted thermocouple voltage value to the temperature value; and
transmit the temperature value to the PLC.

5. The system of claim 1, wherein the thermocouple input module is further operational to reset the one or more calibration factors to one or more factory calibration default values stored in the thermocouple input module in response to receiving reset instructions.

6. The system of claim 1, wherein the adjusted thermocouple voltage value is obtained via linear voltage compensation.

7. The system of claim 1, wherein the firmware is a set of machine-readable instructions that are stored in a non-volatile read-only memory.

8. A method comprising:
receiving at a thermocouple input module calibration voltage values from a thermocouple during a user calibration process performed after a factory calibration process;
determining via firmware stored in the thermocouple input module one or more calibration factors based on the received calibration voltage values;
storing the calibration factors in the thermocouple input module;
receiving at the thermocouple input module an incoming thermocouple voltage value from the thermocouple after the user calibration process;
applying at the thermocouple input module the calibration factors to the incoming thermocouple voltage value to obtain an adjusted thermocouple voltage value prior to obtaining a temperature value,
converting the adjusted thermocouple voltage value to the temperature value; and
transmitting the temperature value to a programmable logic controller (PLC), wherein the PLC utilizes the temperature value as an input in a control program adapted to cause operation of an actuator.

9. The method of claim 8, wherein the calibration factors are selected from an offset, positive voltage gain, negative voltage gain, and a cold junction temperature adjustment based on the received calibration voltage values from the thermocouple.

10. The method of claim 8, wherein the adjusted thermocouple voltage value is obtained via linear voltage compensation.

11. The method of claim 8, wherein the temperature value approximately corresponds to the incoming thermocouple voltage value.

12. The method of claim 8, further comprising resetting the calibration factors to stored default calibration factors via the thermocouple input module.

* * * * *